Nov. 17, 1959                W. W. ALLEN ET AL                2,912,896
                    TIME LAPSE ATTACHMENT FOR MOVIE CAMERAS
Filed July 16, 1956                                    3 Sheets-Sheet 1

INVENTORS.
WADE W. ALLEN
NORMAN A. DRAKE
BY

Woodhams, Blanchard & Flynn
ATTORNEYS

Nov. 17, 1959 W. W. ALLEN ET AL 2,912,896
TIME LAPSE ATTACHMENT FOR MOVIE CAMERAS
Filed July 16, 1956 3 Sheets-Sheet 2
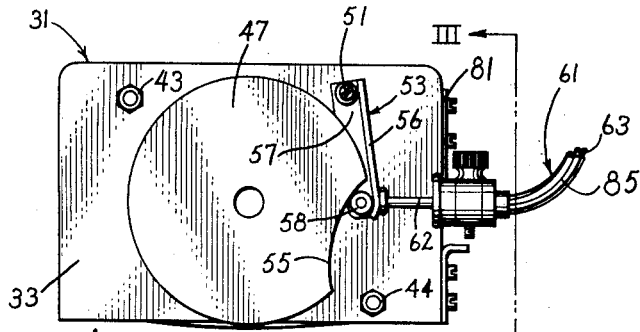
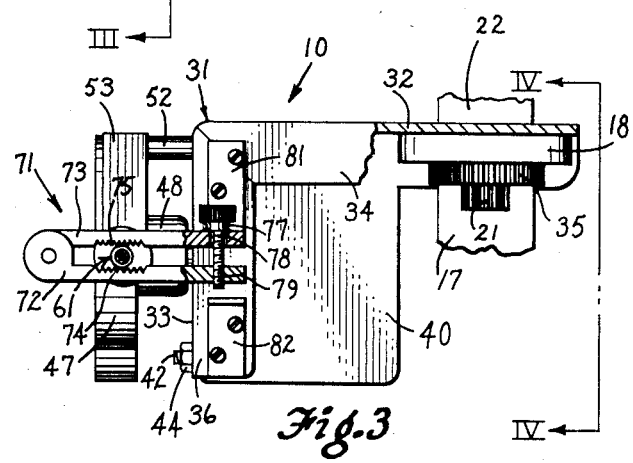
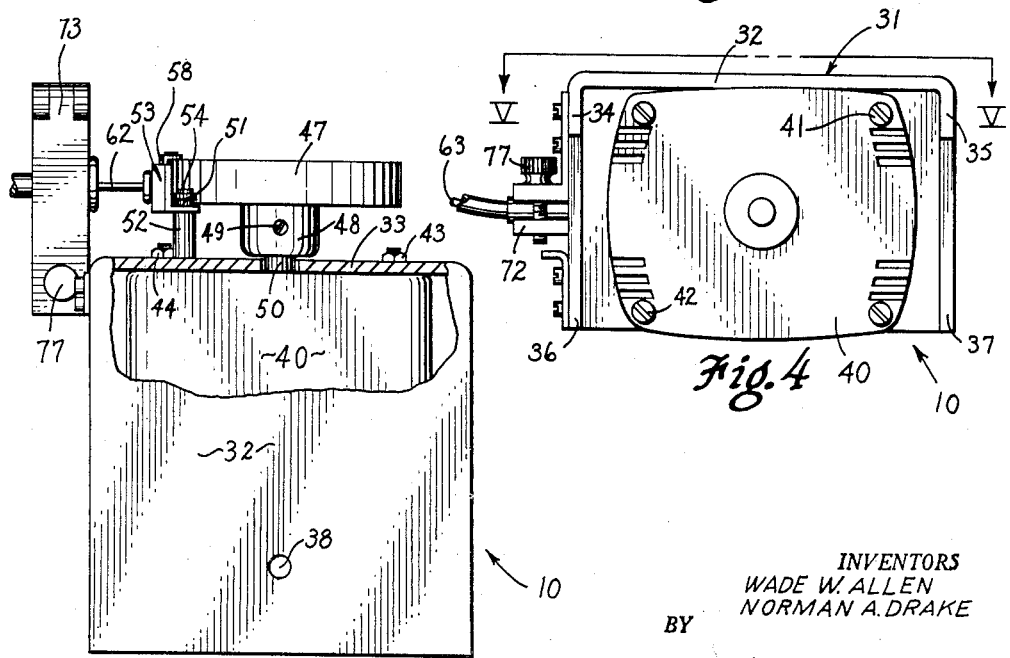
INVENTORS
WADE W. ALLEN
NORMAN A. DRAKE
BY
Woodhams, Blanchard & Flynn
ATTORNEYS Nov. 17, 1959 W. W. ALLEN ET AL 2,912,896
TIME LAPSE ATTACHMENT FOR MOVIE CAMERAS
Filed July 16, 1956 3 Sheets-Sheet 3

INVENTORS
WADE W. ALLEN
NORMAN A. DRAKE
BY
Woodhams, Blanchard & Flynn
ATTORNEYS

United States Patent Office 2,912,896
Patented Nov. 17, 1959

2,912,896

TIME LAPSE ATTACHMENT FOR MOVIE CAMERAS

Wade W. Allen, Kalamazoo Township, Kalamazoo County, and Norman A. Drake, Portage Township, Kalamazoo County, Mich., assignors to The Upjohn Company, Kalamazoo, Mich., a corporation of Michigan Application July 16, 1956, Serial No. 598,115

4 Claims. (Cl. 88—16)

This invention relates to an apparatus for operating the single frame exposure mechanism of a motion picture camera at selected intervals, and it relates particularly to a motor driven device utilizing a cam which acts through a cable release plunger to actuate the single frame exposure mechanism.

In commercial, and advanced amateur, motion picture photography, it is sometimes desired to make a series of individual exposures of a relatively slow action of a subject, which exposures are often spaced quite materially apart in time. Thus, when the film is projected at the normal speed, the resulting moving picture shows the action at an accelerated rate of speed. For example, in many botanical studies, it is desirable to record the opening of a flower. To do this, the motion picture camera is mounted on a fixed support and focused on the flower. It is then actuated to expose a series of single frames of the film at timed intervals, which intervals may be on the order of several minutes each. When the film, which is exposed in this fashion, is run at normal speed through a projector, the opening of the flower, which may have required several hours, is projected on the screen in possibly one minute. Thus, the flower appears to open at a greatly accelerated speed. This technique, which is popularly referred to as "time-lapse" or "stop motion" cinematography, is useful for a variety of purposes in the entertainment and industrial fields. Particularly, in the chemical research field, this technique is useful for recording relatively slow acting phenomena, such as organic chemical reactions, wherein the visual watching of a reaction by a chemist would be both an expensive procedure for the organization carrying out the research and a tedious occupation for the chemist involved.

Many devices have been previously offered to the trade for time lapse cinematography purposes but, insofar as we are aware, they are all of rather complex nature and hence are quite expensive or of such limited adaptability as to be of little use. These devices are ordinarily attachments for cameras and usually are adapted for use with only one specific brand of camera and will not be usable with other brands. Some of them utilize intermittently operable motors which are mounted directly on the camera case and which are directly connected to the shutter and film wind mechanism of the camera for operation thereof. This connection may be effected in any suitable way, according to the type of camera involved, such as connection to the external shaft which is usually provided for continuous operation of the camera mechanism. A timer is provided, usually in another mechanism and often spaced at some distance from said motor, by which the motor is intermittently actuated for a predetermined time period, e.g., ½ second for exposure of a selected number of frames, e.g., 24. This apparatus is usually heavy and awkward to handle and requires special supporting structures and the like. Thus, the prior art devices of this type have not been conveniently portable nor have they been particularly useful for taking a variety of sequences where the camera is moved to different locations between the sequences. Further, it is inconvenient to mount the driving motor onto the camera case and the operation of such a motor often results in the exposure of more frames of the film than is desired or necessary. If too many frames of the film are exposed each time the motor is actuated, the film must be heavily edited or the resulting motion picture will show the development of the motion, such as the opening of a flower, in a stepwise manner rather than in a continuous manner.

Other types of prior art apparatus are usable with the type of camera which has a reciprocable, manually controlled trigger mechanism, said mechanism when moved in a suitable direction effecting exposure of a single frame. With a camera of this type, the exposure of single frames at more frequent intervals results in a sequence of frames which shows the operation more smoothly than the mechanism discussed in the preceding paragraph and without any stepwise appearance. The devices for actuating cameras of this type for time lapse photography sequences often involve a solenoid whose core is connected to the trigger mechanism of the camera and the solenoid is then operated from a timer of the same general character as that used for intermittently operating the motor as above described. This mechanism is also expensive, involves a sometimes serious problem in mounting the solenoid structure on the camera and, since the mechanism is elaborate, it is often subject to break-down.

In general, the prior art devices have not found widespread acceptance, particularly with users who have only occasional need for such devices, because of their high cost and their lack of adjustability over wide ranges of time intervals and their inability to be conveniently moved to various locations and quickly set up for filming relatively short sequences. Further, the adjustment of such prior art devices for varying the time interval between successive exposures, where such devices have been available and effective at all, has required expensive timers which are complicated and get out of adjustment quite easily. The prior art devices have been of limited utility and restricted adaptability in that they required special mounting structures and have not been mountable upon conventional tripods and, in fact, have not ordinarily been usable with cameras mounted on conventional tripods. Further, it has been observed that prior art devices have not usually been particularly suitable for microcinematography where there is a rigid connection between the camera and the microscope because of the vibrations imparted to the camera and microscope by the driving motor of the timing and/or actuating unit.

Thus, it is, and has long been, desirable to provide an apparatus usable with a motion picture camera having a single frame exposure mechanism which will actuate the single frame exposure mechanism at selected periodic intervals and which will do so simply, reliably, and with great flexibility in the length of the intervals utilized, which will be conveniently portable and which will be both inexpensive to manufacture and to maintain in accurate operating condition.

Accordingly, it is a principal object of this invention to provide an improved attachment for motion picture cameras for taking time lapse cinematography sequences.

It is a further object of this invention to provide an improved attachment, as aforesaid, which is mountable upon a conventional tripod and which is adapted for use with conventional motion picture cameras.

It is a further object of this invention to provide a new and improved time lapse cinematography attachment, as aforesaid, utilizing a conventional cable release plunger structure for actuating the camera mechanism, said cable release structure being operated at cyclically timed intervals.

It is a further object of this invention to provide a new and improved time lapse photography attachment, as aforesaid, which does not require any special adaptation of the camera or the tripod for its successful use.

It is a further object of this invention to provide a new and improved time lapse cinematography attachment, as aforesaid, which requires no special mounting structures and which can be conveniently transported to various locations and quickly set up for operation.

It is a further object of this invention to provide a new and improved time lapse photography attachment, as aforesaid, which consists of a relatively few parts, and which is inexpensive to manufacture and effective in operation.

It is a further object of this invention to provide a new and improved time lapse photography attachment, as aforesaid, which can be conveniently adjusted for operation at various speeds.

Other objects and advantages of this invention will become apparent to those acquainted with equipment of this type upon reading the following description and inspecting the accompanying drawings, in which:

Figure 2 is a side elevational view of the attachment taken from the opposite side of Figure 1.

Figure 3 is an elevational view of the attachment from the line III—III of Figure 2, with parts thereof broken away.

Figure 4 is an elevational view taken from the line IV—IV of Figure 3.

Figure 5 is a broken, plan view of the attachment taken from the line V—V of Figure 4.

*General description*

In general, the invention provides an attachment, which is mountable upon the camera support platform of a conventional tripod, and includes a motor which drives a cam. A cable release is provided with its manual plunger in continuous operative engagement, through a suitable cam follower, with the cam. The other end of said cable release is connected to the slide button of a conventional motion picture camera for actuating the shutter and film winding mechanism thereof for making single frame exposures at suitably timed intervals.

*Detailed description*

Figure 1:
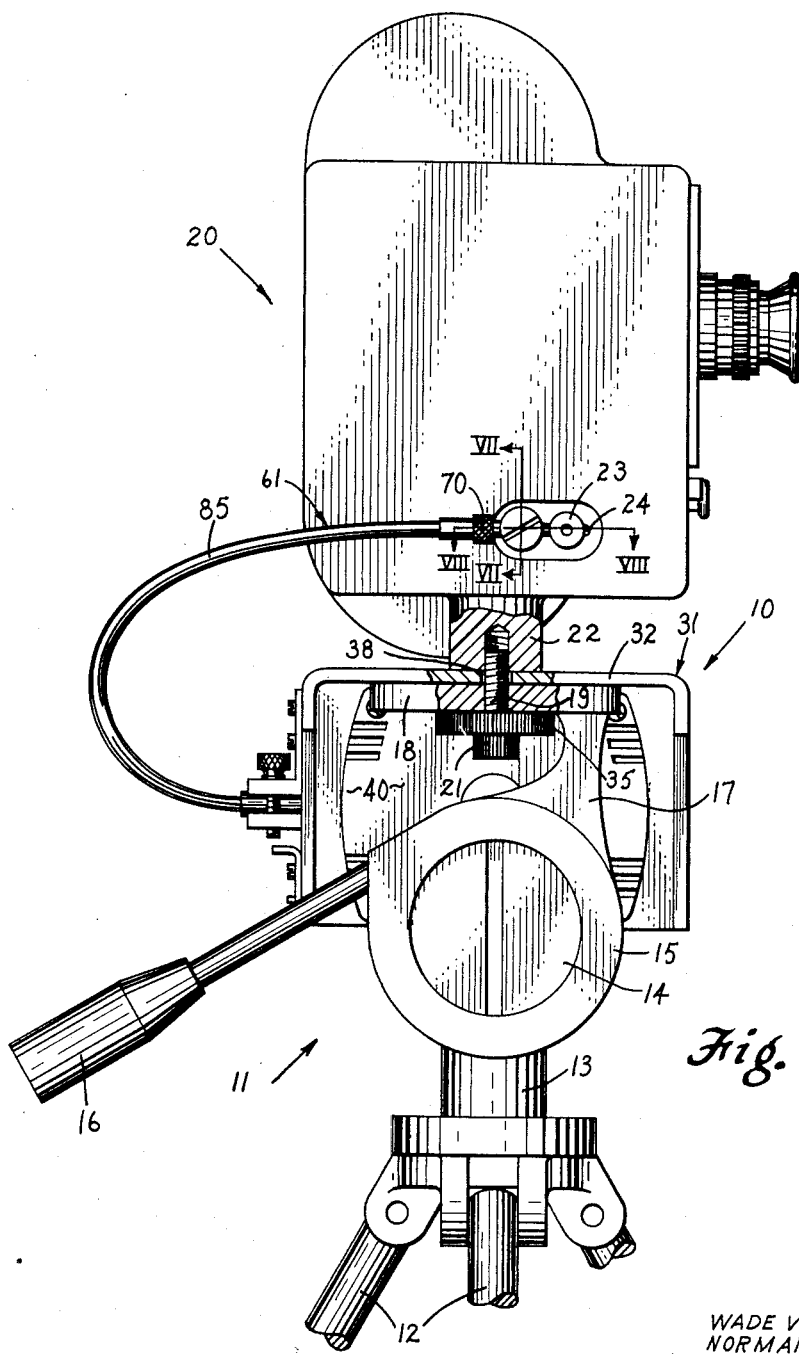
Figure 1 is a side elevational view of the assembly of a camera, a tripod, and the attachment to which this invention relates, with parts thereof broken away.

As shown in Figures 1 and 3, the attachment 10, to which this invention relates, is mounted upon a conventional tripod 11, which includes a plurality of legs 12, a pivotally mounted vertical shaft 13, a horizontal shaft 14, and a yoke 15, which is pivoted upon the shaft 14. A handle 16 is connected to the yoke 15 for causing pivotal movement of yoke 15 about a horizontal axis and pivotal movement of shaft 13 about a vertical axis in conventional manner. A support arm 17 is connected to the yoke 15 and has a camera support platform 18 at its upper end. The platform 18 has an opening 19 therethrough. A motion picture camera 20 is supported on platform 18 and is secured thereto by a threaded connector bolt 21, which passes through said platform and threadedly engages a post 22, said post being integral with said camera. The camera has a slide button 23 movable along the slotted track 24 for operation of the shutter and film winding mechanism in a conventional fashion. The slide button 23, when moved rightwardly, as appearing in Figure 1, from its intermediate position on track 24, causes exposure of a single frame of the film, and upon return to its intermediate position, causes winding of the film in preparation for the next exposure. Movement of the slide button 23 leftwardly, as appearing in Figure 1, from its intermediate position, will effect a continuous operation of the camera in a conventional fashion.

The description thus far given is that of a conventional tripod and a conventional motion picture camera. The attchament 10 (Figures 2, 3, 4 and 5) about to be described, does not relate to the details of the construction of the camera or tripod and, accordingly, it is believed unnecessary to describe the structure of said camera or tripod in greater detail.

The attachment 10 includes a support structure 31 (Figures 1, 2, 3 and 4) which has a horizontal wall 32 and a vertical wall 33. Side flanges 34 and 35 extend substantially at right angles to the horizontal wall 32, while flanges 36 and 37 extend substantially at right angles to the vertical wall 33. Flanges 34 and 36 and flanges 35 and 37, respectively, are co-planar (Figure 4). An opening 38 (Figures 1 and 5) is provided through the horizontal wall 32 for receiving the connector bolt 21 therethrough.

An electric motor 40 is positioned adjacent the juncture of walls 32 and 33 and is secured to the vertical wall 33 by bolts 41 and 42 which are connected to the motor and pass through vertical wall 33 and are secured thereto by nuts 43 and 44. The motor 40 is offset with respect to the opening 38 so as not to interfere with the connection of the attachment 10 to the tripod and camera. The motor shaft is connected through conventional reduction gearing, disposed within the motor casing, to the output shaft 50, whereby said output shaft may be rotated at a slow speed, as one revolution per second.

A disc cam 47 (Figures 2 and 5) is mounted on the output shaft 50, said cam having a hub 48, which is mounted on the end of said shaft and held in position thereon by a set screw 49. As shown, the cam 47 has one notch 55 in its periphery. It will be seen that this effects the exposure of one frame per second, in this embodiment. If it is desired to make more frequent exposures, another cam having a plurality of notches may be substituted for cam 47. It it is desired to make less frequent exposures, the speed of the shaft 50 may be reduced by further reduction gearing.

A post 51 (Figures 2 and 5) is secured to the outer surface of the vertical wall 33 and a sleeve 52 surrounds the portion thereof adjacent to said vertical wall. An elongated arm 53 is secured at one end to said sleeve 52 and thereby pivotally mounted on post 51. A removable retaining collar 54 (Figure 5) is secured to post 51 and prevents sleeve 52, hence the arm 53, from sliding off said post. The arm 53 may be an angle member, including a pair of flanges 56 and 57 (Figure 2). A roller 58 is secured to flange 57 adjacent to the other end of said arm 53, remote from post 51. The roller 58 engages the cam 47 and constitutes a cam follower.

Figure 8:
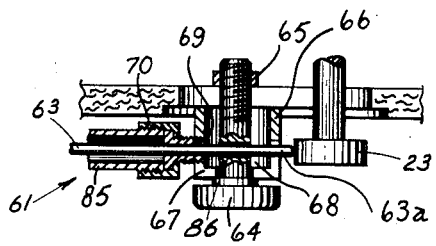
Figure 8 is a sectional view along the line VIII—VIII of Figure 1.
Figure 7:
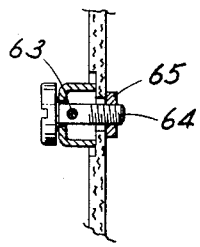
Figure 7 is a sectional view along line VII—VII of Figure 1.

A substantially conventional cable release mechanism 61 (Figures 1, 2 and 8) is provided to actuate the slide button 23 of the camera 20. The cable release mechanism 61 includes a plunger 62, which is spring-urged to contact the flange 56 on arm 53 and thereby hold the roller 58 in engagement with cam 47. A cable 63 is connected at one end to the plunger 62 and engages the slide button 23 at its other end 63a, whereby movement of said plunger in response to movement of arm 53 will actuate the slide button 23. The structure, whereby the cable end 63a is maintained in contact and alignment with the slide button 23, includes a bolt 64 which extends through the slot 24 in the camera housing. The bolt has a retaining collar 65 thereon (Figure 7), said collar being adapted to be aligned with, and pass through, the slot 24 to the interior of the camera housing and then to be turned 90° into engagement with the interior wall of the camera whereupon the bolt 64 may be fixed with respect to the camera housing by tightening it within the collar 65. A cap 66, which surrounds the shank of bolt 64, has a central cavity 68 and slot 67 which communicates with said cavity. A nipple 69 is secured, in a conventional manner, to the end of the cable housing 85 of the release mechanism 61 by means of a connector 70. The nipple 69 is threadedly received through an appropriate opening in the sidewall of the cap 66 which is aligned with the slot 67. Thus, the cable end 63a can extend from the nipple 69 through the slot 67, the cavity 68 and the opening 86 to engage the button 23. An opening 86 is provided in the shank of bolt 64 for receiving the cable end 63a therethrough. It is ordinarily not necessary to connect the cable to the slide button 23 because the slide button will be urged toward its intermediate position by a spring. However, the cable can be connected thereto if desired.

The cable release mechanism 61 is held in fixed position with respect to attachment 10 by a clamping structure of which one suitable form is shown at 71. This clamping structure includes a pair of pivotally connected arms 72 and 73, said arms having serrated, opposed portions 74 and 75 (Figure 3). A clamping member 77 is adapted to pass through an opening 78 in arm 73 and to be threadedly secured in the opening 79 through the arm 72. A mounting bracket 81, which is secured to the upper arm 73, is mounted upon the flanges 34 and 36 for supporting the structure 71 on the structure 31. A bracket 82 is also mounted upon the flange 36 below, and engageable by, the lower arm 72.

It is apparent that the attachment 10 is useful with a variety of tripods, whose details of construction may vary widely from the particular tripod illustrated herein. Also, the attachment need not be mounted on the tripod, but may be mounted on a separate support structure, if desired. However, the attachment has particular advantages when mounted on the tripod and, accordingly, has been described primarily with reference thereto. Likewise, the construction of the camera may be varied widely within the scope of the invention. Accordingly, it is to be understood that the description relating the attachment to a specific camera and tripod is for illustrative purposes only.

Operation

In mounting the attachment 10 on the platform 18, the opening 38 in the horizontal wall 32 is brought into registry with the opening 19 in platform 18. The camera 20 is placed on horizontal wall 32, with its support post 22 and the opening therein in registry with openings 38 and 19. The connector bolt 21 is then threaded into the opening in the camera support post to lock the camera and the attachment 10 in fixed position with respect to platform 18.

In use, the operation of the motor 40 will cause rotation of the cam 47 at a predetermined speed. Due to the interaction between the cam 47, cam follower 58 and plunger 62, said plunger will be depressed (urged rightwardly as appearing in Figure 2) at all times except when the follower 58 is in the notch 55. Thus, when the follower drops into the notch 55, the plunger 62 will first be extended by its own spring action, as well as the spring tension on the button 23, which engages the end 63a of the cable 63 secured to the plunger 62. This will lock the camera shutter and move the film therein to the next frame. The subsequent movement of the follower 58 out of the notch 55 will depress the plunger 62 and thereby move the slide button 23 rightwardly, as appearing in Figure 1. This will open and close the camera shutter, in conventional fashion, to expose a single frame of the film. When the plunger 62 is again released by the notch 55, the cable 63 will move leftwardly, as appearing in Figure 1, to return the slide button 23 to its intermediate position, whereby the shutter is locked and the film wind mechanism will be actuated to bring a new frame into position for a subsequent exposure. Thus, the cam 47 will effect an exposure as follower 58 moves from the low dwell to the high dwell of the cam 47, and will effect a rewind as the follower moves from high dwell to low dwell. This arrangement of a prolonged high dwell also permits time exposures of a variety of duration.

Figure 6:
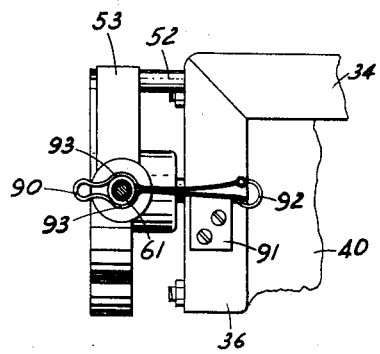
Figure 6 is a fragmentary view similar to Figure 3 and showing a modification.

A modification of the structure for gripping the cable release mechanism 61, adjacent to the support structure 31, is shown in Figure 6 and includes a substantially V-shaped member 90, the lower leg of which is secured to flange 36 by a bracket 91. The legs of the V-shaped member 90 are normally spaced from each other. A hook 92 is pivotally secured to the upper one of the legs and is adapted to engage the lower leg to draw said legs together. Opposed portions 93 of the legs are bowed away from each other to provide an enlarged space therebetween in which the cable release mechanism 61 may be disposed. When the hook 92 draws the legs together the cable release mechanism will be effectively gripped thereby.

Although particular, preferred embodiments of this invention have been herein utilized for illustrative purposes, it will be understood that variations and modifications thereof which may be made without departing from the purposes of all phases of the invention are fully contemplated, except as the hereinafter appended claims by their own terms expressly limit otherwise.

We claim:

1. An attachment for making time lapse photography sequences, said attachment being connectible to a tripod and to the shutter actuating mechanism of a motion picture camera, including in combination: a support structure including a horizontal wall and a vertical wall integral therewith, said horizontal wall having an opening therethrough, said opening being on one side of the center of said horizontal wall and providing for connection of said attachment to said tripod; an electric motor mounted on said support structure below the lower surface of said horizontal wall, said motor being positioned between and adjacent the juncture of said horizontal and vertical walls and being on the other side of the center of said horizontal wall from said opening; a shaft extending through said vertical wall and connected to said motor for rotation therewith; a cam connected to said shaft for rotation therewith, said cam having a peripheral cam surface; a post secured to said vertical wall and extending parallel with said shaft; an arm pivotally mounted on said post and extending substantially tangentially of said cam, said arm having a cam follower thereon; a spring-pressed plunger bearing on said arm and resiliently urging said cam follower into engagement with said cam surface; a cable connected at one end to said plunger and connected at its other end to the shutter actuating mechanism of the camera; a clamp secured to said support structure and detachably embracing said cable and plunger for holding same in fixed position with said plunger being directed radially of said cam.

2. An attachment for making time lapse photography sequences, said attachment being mountable upon a tripod and being connectible to the shutter actuating mechanism of a motion picture camera, including in combination: a support structure including a horizontal wall and a downwardly extending vertical wall, said horizontal wall having an opening therethrough whereby said support structure may be mounted on a tripod; an electric motor mounted on said support structure and positioned below the lower surface of said horizontal wall adjacent the juncture thereof with said vertical wall, the shaft of said motor extending horizontally through said vertical wall; a cam mounted on said motor shaft for rotation thereby; an arm pivotally mounted on said vertical wall, said arm having a cam follower thereon;

a cable connectible at one end to the shutter actuating mechanism of a camera; a spring-urged plunger connected to the other end of said cable, said plunger bearing on said arm and urging said cam follower into engagement with the periphery of said cam; and means on said support structure for supporting said plunger with said plunger bearing against said arm.

3. An attachment for making time lapse photography sequences, said attachment being mountable upon a tripod and being connectible to the shutter actuating mechanism of a motion picture camera, including in combination: a support structure including a horizontal wall having an opening therethrough for mounting said support structure on a tripod; an electric motor mounted on said support structure; a cam mounted on the shaft of said electric motor for being rotated thereby, said cam having a peripheral cam surface; a cable connectible at one end to the shutter actuating mechanism of a camera; a spring-urged plunger connected to the other end of said cable; a clamp secured to said support structure and releasably embracing said cable and plunger for holding same in position with said plunger being positioned adjacent the periphery of said cam and being directed radially of said cam; and means for moving said plunger to and fro in response to rotation of said cam.

4. An attachment for making time lapse photography sequences, said attachment being mountable upon a tripod and being connectible to the shutter actuating mechanism of a motion picture camera, including in combination: a support structure including a horizontal wall and a vertical wall integral therewith, said horizontal wall having an opening therethrough remote from said vertical wall and on one side of the center of said horizontal wall for mounting said support structure on a tripod; an electric motor mounted on said support structure and positioned below the lower surface of said horizontal wall and adjacent the juncture of said horizontal and vertical walls, the shaft of said motor extending horizontally through said vertical wall; a cam having a peripheral cam surface connected to said shaft for rotation therewith; a post secured to said vertical wall and extending parallel with said shaft; an arm pivotally mounted on said post and extending substantially tangentially of the periphery of said cam, said arm having a first wall extending parallel with said vertical wall and a second wall extending away from said vertical wall; a roller rotatably mounted on said first wall and adapted to contact and follow said cam surface; a cable connectible at one end to the shutter actuating mechanism of a camera; a spring-urged plunger connected to the other end of said cable, said plunger bearing on said second wall of said arm and urging said roller into engagement with said cam surface; a clamp secured to said support structure and detachably embracing said cable and plunger for holding same in position with said plunger being directed radially of said cam, said clamp including a pair of elongated arms secured to the support structure and extending parallel with said motor shaft, said arms being connected together for relative swingable movement at the outer ends thereof and means for detachably securing the inner ends of said arms together so that said cable and plunger may be releasably gripped therebetween.

References Cited in the file of this patent
UNITED STATES PATENTS

| | | |
|---|---|---|
| 916,346 | Martin et al. | Mar. 23, 1909 |
| 1,217,493 | Parsons | Feb. 27, 1917 |
| 1,270,612 | Green | June 25, 1918 |
| 1,326,699 | Speck | Dec. 30, 1919 |
| 1,413,187 | Paumier | Apr. 18, 1922 |
| 1,543,741 | Anderson | June 30, 1925 |
| 2,254,489 | Morton | Sept. 2, 1941 |
| 2,552,250 | Bornemann et al. | May 8, 1951 |

FOREIGN PATENTS

| | | |
|---|---|---|
| 241,172 | Great Britain | Mar. 25, 1926 |
| 621,183 | France | Jan. 31, 1927 |
| 385,716 | Great Britain | Jan. 5, 1933 |
| 457,375 | Great Britain | Nov. 26, 1936 |